United States Patent [19]

Olkowski, Jr. et al.

[11] 4,091,640
[45] May 30, 1978

[54] POWER DRIVE YOKE

[75] Inventors: Stanley Olkowski, Jr., Detroit; John Christee McElwain, Rochester, both of Mich.

[73] Assignee: Rockwell International Corporation, Pittsburgh, Pa.

[21] Appl. No.: 715,939

[22] Filed: Aug. 19, 1976

[51] Int. Cl.² ............................................. F16D 3/06
[52] U.S. Cl. ............................................. 64/4; 64/6; 64/17 R
[58] Field of Search ................... 64/4, 17 R, 9 R, 23.6

[56] References Cited
U.S. PATENT DOCUMENTS

| | | | |
|---|---|---|---|
| 2,910,842 | 11/1959 | Sensenig | 64/4 |
| 3,357,206 | 12/1967 | Christie | 64/4 |

*Primary Examiner*—Benjamin W. Wyche
*Assistant Examiner*—R. C. Turner

[57] ABSTRACT

A power drive yoke adapted for quick attachment to and disconnection from an output drive shaft of a power drive means comprises a yoke having a hub formed thereon. The hub has a centrally disposed longitudinally extending bore for accepting a portion of the output drive shaft. The output drive shaft is mechanically interconnected to the yoke to rotationally drive the yoke by passing means. An annular groove is provided on the portion of the output shaft and is accepted within the bore in the hub. The hub is provided with at least two generally parallel bores each tangentially intersecting the bore on its opposite sides. A locking pin is slidably disposed in each of the parallel bores and has a locking surface thereon to engage the annular groove on the output shaft. Means are provided to connect each of the locking pins to substantially simultaneously slidably move the locking pins within the bores into engagement and disengagement with the output shaft at its annular groove.

10 Claims, 2 Drawing Figures

POWER DRIVE YOKE

BACKGROUND OF THE INVENTION

1. Field of the Invention

This invention relates generally to power drive yokes which are particularly adapted for quick engagement to and disconnection from an output drive shaft of a power takeoff assembly as typically found on off-highway equipment.

2. Description of the Prior Art

In the agricultural industry, for example, there are many auxiliary forms of equipment which receive their motive force from the tractor engine through a driving train which is connected to an output drive shaft specifically provided for that purpose. There are many situations that require quick disconnection of this auxiliary equipment from the main drive tractor or the like. It is typically important that the operator be required to use only one hand to effectively manipulate the disconnect assembly or yoke from the drive shaft while freeing the other hand to maneuver the equipment associated on auxiliary equipment away or toward the tractor. Additionally, having a free hand available results in a safer environment in that the operator can quickly adjust to a sudden change in circumstances.

SUMMARY OF THE INVENTION

Accordingly, it is a primary object of the present invention to provide a power drive yoke adapted for quick attachment to and disconnection from an output drive shaft of a power drive means comprising a yoke having a hub formed thereon. The hub has a centrally disposed longitudinally extending bore for accepting a portion of the output drive shaft. The output drive shaft is mechanically interconnected to the yoke to rotationally drive the yoke by passing means. An annular groove is provided on the portion of the output shaft and is accepted within the bore in the hub. The hub is provided with at least two generally parallel bores each tangentially intersecting the bore on its opposite sides. A locking pin is slidably disposed in each of the parallel bores and has a locking surface thereon to engage the annular groove on the output shaft. Means are provided to connect each of the locking pins to substantially simultaneously slidably move the locking pins within the bores into engagement and disengagement with the output shaft at its annular groove.

It is another object of the present invention to provide a power drive yoke wherein the fastening means includes a splined portion provided on the inner surface of the bore on the hub to meshingly accept a complementary splined portion of the output drive shaft.

It is yet another object of the present invention to provide a power drive yoke wherein the connecting means includes a bar member having an aperture at each end to receive the ends of the pins. Securing means are provided to secure the bar member to each of the pins. Biasing means are provided in the hub to bias the locking pins into engagement with the output shaft.

It is a still further object of the present invention to provide a power drive yoke wherein the locking surfaces on the locking pins comprise an annular tapered surface disposed on the locking pins tapered at such an angle so as to tangentially engage the annular groove on the output shaft.

Another object of the present invention is to provide a power drive yoke wherein the securing means securing the bar member to each of the locking pins comprises an aperture at each end of the pins which are in registration with an aperture at each end of the bar member. Roll pin members are inserted in the aperture in the bar member and the locking pin and there is a clearance between the bar member and the locking pins to allow for a limited relative movement therebetween.

It is yet a further object of this invention to provide a power drive yoke wherein the biasing means is a spring member disposed in a recess in the hub and a complementary recess in the bar member.

It is still a further object of this invention to provide a power drive yoke wherein each of the locking pins is provided at their ends opposite the ends secured to the bar member a limit stop means to limit the longitudinal travel of the locking pins.

It is still another object of this invention to provide a power drive yoke wherein the locking pins have a cutaway portion which when brought into alignment with the output drive shaft provides a clearance between the locking pins and the output drive shaft to enable the yoke to be withdrawn longitudinally from the output shaft to disconnect it therefrom.

A further object of this invention is to provide a power drive yoke wherein the limit stop means is a retainer washer fixedly attached to one end of each locking pin.

Another object of the present invention is to provide a power drive yoke wherein the bar member is generally perpendicular to each of the parallel pin members and is adapted to be grasped and manipulated by a single hand of an operator.

A still further object of this invention is to provide a power drive yoke wherein the portion of the locking pins to which the retainer washers are attached have a reduced diameter. This reduced diameter portion of the locking pins extends through an opening provided in a wall at the end of the parallel bores.

It is another further important object of the present invention to provide a quick disconnect power drive yoke which is highly efficient and effective for engagement and disengagement of auxiliary equipment to a power takeoff mechanism, which power drive yoke is capable of being manufactured using high volume, automated techniques requiring limited machining precision.

Other objects and advantages will become apparent as the present invention is better understood from the following description and as shown in the accompanying drawings.

DESCRIPTION OF THE INVENTION

Figure 2:
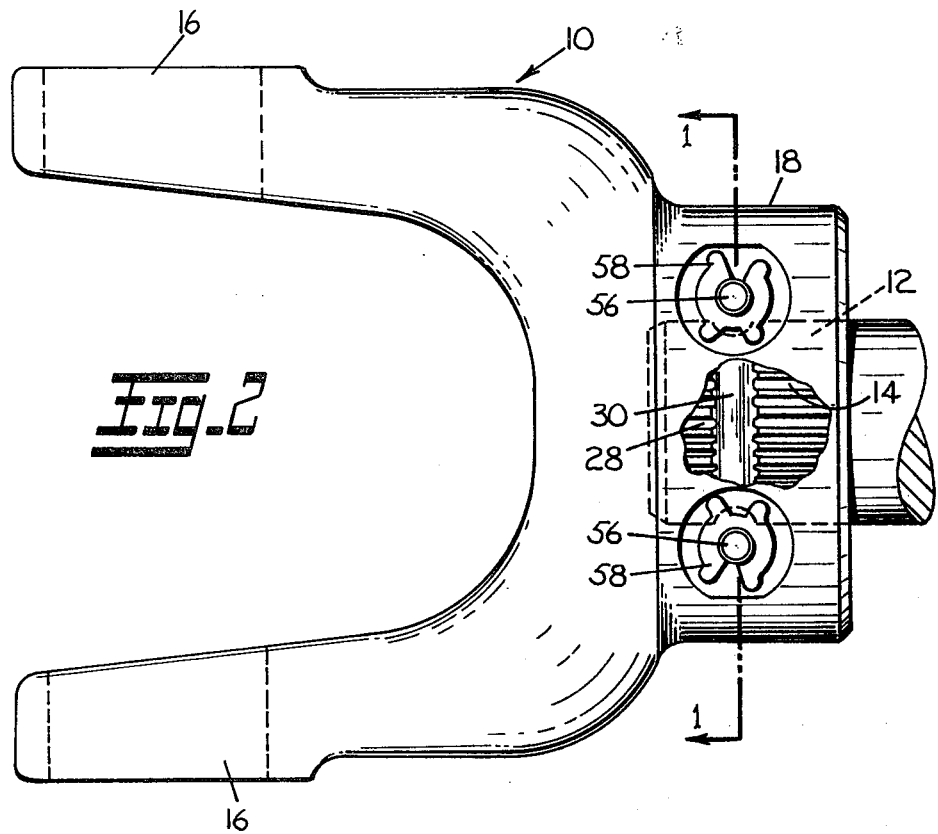
FIG. 2 is an end view of the power drive yoke of FIG. 1 also partially cut-away and in phantom.
Figure 1:
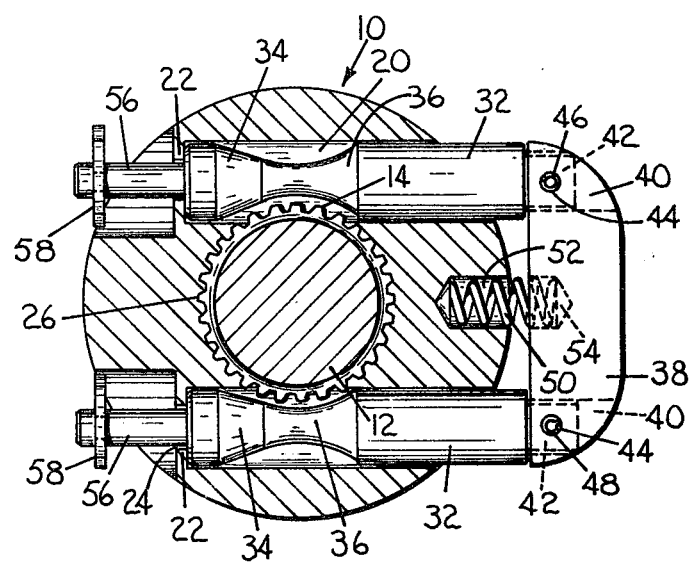
FIG. 1 is a side view in elevation partially cut-away of the power drive yoke in accordance with the present invention.

The present invention relates to a power drive yoke 10 as shown in FIGS. 1 and 2. More particularly, the power drive yoke 10 is adapted for quick attachment to and disconnection from an output shaft 12 as typically found on off-highway equipment as, for example, agricultural tractors. The output shaft 12, as found in a typical agricultural tractor arrangement, is provided with a series of splines 14 whose purpose will be described further below.

The power drive yoke 10, in its general outline form, is not unlike those power drive yokes found in the prior art. In that regard, the power drive yoke 10 is adapted to receive a universal joint mechanism and, more particularly, the trunions of a universal joint "tee" and their associated needle bearings in openings 16 provided at each end of the yoke 10. The basic thrust of the present invention is directed to the hub end 18 of the power drive yoke 10. It is in this area that there is provided a mechanism to achieve the above-noted quick disconnection of the yoke from the output shaft 12.

The various features of this mechanism are shown in both FIGS. 1 and 2 wherein the hub 18 is provided with two generally parallel bores 20. The bores 20 may be circular in cross section and terminate at a shoulder 22 having an opening 24 therethrough which may also be circular in cross section.

The hub 18 is further provided with a generally centrally disposed longitudinally extending bore 26 having such a diameter to accept and receive therein a portion of the output shaft in a mechanically interlocked relationship. This relationship is effected by the meshing of the splines 28 provided on the inner surface of the bore 26 of the hub 18 with the splines 14 provided on the outer surface of the output shaft 12. That is to say the power drive yoke 10 will be driven by and rotate with the output drive shaft 12. The splines 14 and 28 will rotationally interlock the power drive yoke with respect to the output shaft but will not maintain the relative longitudinal position of these two parts.

Each of the generally parallel portions 20 are so disposed within the hub 18 so as to tangentially intersect the bore 26 of the hub 18 to define an opening therebetween. The point of intersection or opening is positioned within the bore 26 which generally corresponds to the position of an annular groove 30 provided on the output shaft 12 when such output shaft 12 is "bottomed" within such bore 26. The generally parallel bores 20 which are shown in FIG. 1 are oppositely disposed with respect to the bore 26 and are adapted to each receive a locking pin 32. The locking pins 32 are adapted to slidably move axially within each of the bores 20. Each of the locking pins is provided with an annular tapered surface 34 which generally terminates in a cut-away portion 36. The annular tapered surface 34 may be tapered at such an angle so as to tangentially engage the annular groove 30 on the output shaft 12. This engagement by the locking pins 32 at their respective annular tapered surface 34 of the annular groove 30 of the output shaft 12 locks in a longitudinal direction the power drive yoke with respect to the output shaft 12. Conversely, when the locking pins 32 are moved to a position where the cut-away portion 36 is in alignment with the output shaft there will be provided suitable clearance therebetween for the longitudinal disengagement of the power drive yoke 10 from the output shaft 12. Accordingly, it is the axial position of the locking pins 32 which will effect the attachment to and disconnection from the output drive shaft 12. The axial movement of the locking pins 32 is controlled by the manipulation of a bar member 38 which is attached to each of the locking pins 32.

The bar member 38 is provided with an aperture 40 at each end thereof to receive end portions 42 of the locking pins 32. The end portions 42 may be of reduced cross section with respect to the main body of the locking pins and may also have a diameter slightly less than the diameter of the inner surface of the apertures 40 to provide a slight clearance therebetween. The bar member 38 is also provided with a small opening or aperture 44 perpendicular to the apertures 40. The aperture 44 is in registration with aperture 46 provided in the end portions 42 of the locking pins; there being inserted in the apertures 44 and 46 a fastening or securing means such as a roll pin 48. The provision of the roll pin 48 in the apertures 44 and 46 secures the bar member 38 to each of the locking pins 32. The provision of roll pin 48 and the clearance between the end portion 42 and the inner surface of the aperture 40 results in a generally floating relationship between the bar member 38 and locking pins 32. Further, the inside diameter of the generally parallel portion 20 may be slightly larger than the outside diameter of each of the locking pins 32 to further enhance this floating relationship. The importance of this feature will be further explained below.

A biasing spring 50 is disposed in a recess 52 in the hub 18 and in a complementary recess 54 provided in the bar member 38. The biasing action of the spring 50 against the bar member 38 will tend to move the locking pins 32 axially in a direction to drive their annular tapered surfaces 34 into engagement with the annular groove 30. Conversely, compression of the spring 50 by the bar member 38 will tend to move the locking pins 32 in a position to align the cut-away portion 36 with the output shaft 12 whereby the yoke 10 may be moved longitudinally from the output shaft 12. The locking pins 32 may each be provided with extensions 56 which may be of a diameter less than the main body of the locking pins 32. The extensions 56 are in registration with and pass through the circular opening 24 provided in the shoulders 22 provided at the end of each of the parallel bores 20. The extensions 56 may each be provided with a retaining means 58 which may be retaining snap rings fixedly attached to each of the extensions 56. The retaining snap rings 58 limit the axial travel of the locking pins. The outside diameter of the extensions 56 may be generally less than the inside diameter of the circular opening 24 to provide a clearance therebetween.

As before noted, the axial moving locking pins 32 generally float within the generally parallel portion 20 and further the bar member 38 is "flexibly" attached to each of the locking pins 32. The floating and flexible interrelationship of the various above-noted parts effects two important results, namely, that the various parts may be machined or otherwise formed without regard to maintenance of type tolerances and the various parts will move generally easily without binding with respect to each other.

Not only may the various parts of the power drive yoke be manufactured using automatic, high volume manufacturing and machining techniques without regard to the maintenance of type tolerances but can be easily assembled and maintained.

It is, therefore, obvious that the present invention is not to be limited to the specific details of the power drive yoke above described; but is capable of other modifications and changes without departing from the spirit and scope of the appended claims.

We claim:

1. A power drive yoke adapted for quick attachment to and disconnection from an output drive shaft of a power drive means comprising a yoke having a hub formed thereon, said hub having a centrally disposed longitudinally extending bore for accepting a portion of said output drive shaft, said output drive shaft mechanically interconnected to said yoke to rotationally drive said yoke by fastening means, an annular groove provided on the portion of said output shaft accepted within said bore in said hub, said hub being provided with at least two generally parallel bores each tangentially intersecting said bore on opposite sides thereof, a locking pin slidably disposed in each of said parallel bores, said locking pin having a locking surface thereon to engage said annular groove on said output shaft, connecting means connecting each of said locking pins to substantially simultaneously, slidably move said locking pins within said bores into engagement and disengagement with said output shaft at its annular groove, said locking surfaces on said locking pins comprising an annular tapered surface disposed on said locking pins tapered at such an angle so as to tangentially engage said annular groove on said output shaft.

2. The power drive yoke of claim 1 wherein said fastening means includes a splined portion provided on the inner surface of said bore on said hub to meshingly accept a complementary splined portion of said output drive shaft.

3. The power drive yoke of claim 1 wherein said connecting means includes a bar member having an aperture at each end thereof to receive the ends of said pins, securing means securing said bar member to each of said pins, biasing means provided in said hub to bias said locking pins into engagement with said output shaft.

4. The power drive yoke of claim 2 wherein securing means are provided to secure said bar member to each of said locking pins comprises an aperture at each end of said pins which are in registration with an aperture at each end of said bar member, roll pin members inserted in said aperture in said bar member and said locking pin, there being a clearance between said bar member and said locking pins to allow for a limited relative movement therebetween.

5. The power drive yoke of claim 2 wherein said biasing means is a spring member disposed in a recess in said hub and a complementary recess in said bar member.

6. The power drive yoke of claim 1 wherein there is provided on each of said locking pins at their ends opposite the ends secured to said bar member a limit stop means to limit the longitudinal travel of said locking pins.

7. The power drive yoke of claim 2 wherein said locking pins are provided with a cut-away portion which when brought into alignment with said output drive shaft provides a clearance between said locking pins and said output drive shaft to enable said yoke to be withdrawn longitudinally from said output shaft to disconnect it therefrom.

8. The power drive yoke of claim 6 wherein said limit stop means is a retainer washer fixedly attached to each end of said locking pins.

9. The power drive yoke of claim 2 wherein said bar member is generally perpendicular to each of said parallel pin members and is adapted to be grasped and manipulated by a single hand of an operator.

10. The power drive yoke of claim 7 wherein the portion of said locking pins to which said retainer washers are attached have a reduced diameter, said reduced diameter portion of said locking pins extending through an opening provided in a wall at the end of said parallel bores.

* * * * *